United States Patent
Potanin et al.

(10) Patent No.: US 7,560,899 B1
(45) Date of Patent: Jul. 14, 2009

(54) CIRCUIT AND METHOD FOR ADJUSTING SAFETY TIME-OUT WITH CHARGE CURRENT

(75) Inventors: Vladislav Potanin, San Jose, CA (US); Elena Potanina, San Jose, CA (US); Igor Furlan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 519 days.

(21) Appl. No.: 11/013,133

(22) Filed: Dec. 15, 2004

(51) Int. Cl.
*H02J 7/00* (2006.01)
(52) U.S. Cl. .................................... 320/133; 320/132
(58) Field of Classification Search .................. 320/132, 320/133, 155; 323/265, 266, 268, 269, 270–286
See application file for complete search history.

(56) References Cited

U.S. PATENT DOCUMENTS

| | | | |
|---|---|---|---|
| 4,433,277 A * | 2/1984 | Carollo et al. ............... | 320/149 |
| 5,670,863 A | 9/1997 | Broell et al. | |
| 5,710,506 A | 1/1998 | Broell et al. | |

OTHER PUBLICATIONS

Linear Technology, "LTC4054L-4.2 150mA Standalone Linear Li-Ion Battery Charger in ThinSOT".

* cited by examiner

*Primary Examiner*—Akm E Ullah
*Assistant Examiner*—Richard V Muralidar
(74) *Attorney, Agent, or Firm*—Darby & Darby P.C.; John Tolomei (57) ABSTRACT

A method and circuit for adjusting a safety time-out in charging devices based on a charge current. According to one embodiment, a signal that is based on the charge current is employed to control an output of an oscillator, which controls an operation of a safety timer circuit. The safety timer circuit activates or deactivates a voltage-current (V-I) control loop of the charging device providing the safety time-out based on the charge current. In another embodiment, where a digital current-set circuit may be employed to determine a value of the charge current, a Digital-to-Analog Converter (DAC) may provide the charge current limit to the V-I control loop, and another output of the digital current-set circuit may control the safety timer. In a further embodiment, a signal based on the charge current may be digitized and employed to control the safety timer comprising a time-out counter.

11 Claims, 7 Drawing Sheets

CIRCUIT AND METHOD FOR ADJUSTING SAFETY TIME-OUT WITH CHARGE CURRENT

FIELD OF THE INVENTION

The present invention relates to charging devices and more specifically to a circuit and method for adjusting a safety time-out based on a charge current.

BACKGROUND

Generally, batteries are used to supply power to portable devices such as personal computers, radios, radiophones, stereo cassette tape players etc. Such batteries are typically available in two different types such as those characterized as rechargeable or non-rechargeable and exhibit different end of life voltage characteristics and effective series resistances. Non-rechargeable battery types are those ordinary alkaline batteries that should not be subjected to recharging attempts. Rechargeable battery types include nickel-cadmium (Ni—Cd), nickel-hydrogen (Ni—H), lithium-ion (Li-Ion), and recently developed nickel metal-hydride (Ni—MH) batteries that should be charged at different rates with different conditions.

When a rechargeable battery is used as a power supply system for a portable personal computer, cellular phone, and the like, the battery may be charged by a battery charger in different charging modes, for example, a run and charging mode and a run or charging mode. During the run and charging mode, the battery is charged regardless of whether an end device is operating or not, and as a result, the charging operation may be difficult to control. In contrast to the run and charging mode, the run or charging mode allows the battery to be charged selectively depending upon whether the end device is operating or not.

Typically, charging operations of such a battery may be classified in at least one of a fast or rapid charging, a quick charging, a standard charging, and a trickle charging modes. The charging modes may be in relation with charging capacities or charging current of the battery. In the fast charge mode, a relatively larger charging current may be applied to the battery over a relatively short period of time, for example one to two hours. In the quick charge mode, a relatively large charging current may be applied to the battery over a relatively shorter period of time, for example four to six hours. In the standard charge mode, a relatively smaller charging current may be applied to the battery over a relatively longer period of time, for example eight to ten hours. In the trickle charge mode, the battery charging circuit provides a relatively even smaller constant current to the battery without interruption. In this mode, the battery may not be charged but its power loss due to natural discharge may be compensated.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the present invention is related to a method and circuit for adjusting a safety time-out in charging devices based on a charge current. According to one embodiment, a signal that is based on the charge current is employed to control an output of an oscillator, which regulates an operation of a safety timer circuit. The safety timer circuit activates and deactivates a voltage-current (V-I) control loop of the charging device providing the safety time-out based on the charge current.

A charging device may also employ a digital current-set circuit to determine a value of the charge current. According to another aspect of the present invention, a Digital-to-Analog Converter (DAC), which is arranged to receive an output of the digital current-set circuit, may provide the charge current limit to the V-I control loop, while another output of the digital current-set circuit is employed to control the safety timer circuit. In a further embodiment, a signal based on the charge current may be digitized and employed to control the safety timer circuit, which may comprise a time-out counter.

While a preferred embodiment of the present invention may be implemented in a battery charging device, the invention is not so limited. The described circuit may be employed as part of virtually any power supply device with a V-I control loop known to those skilled in the art.

Figure 1:
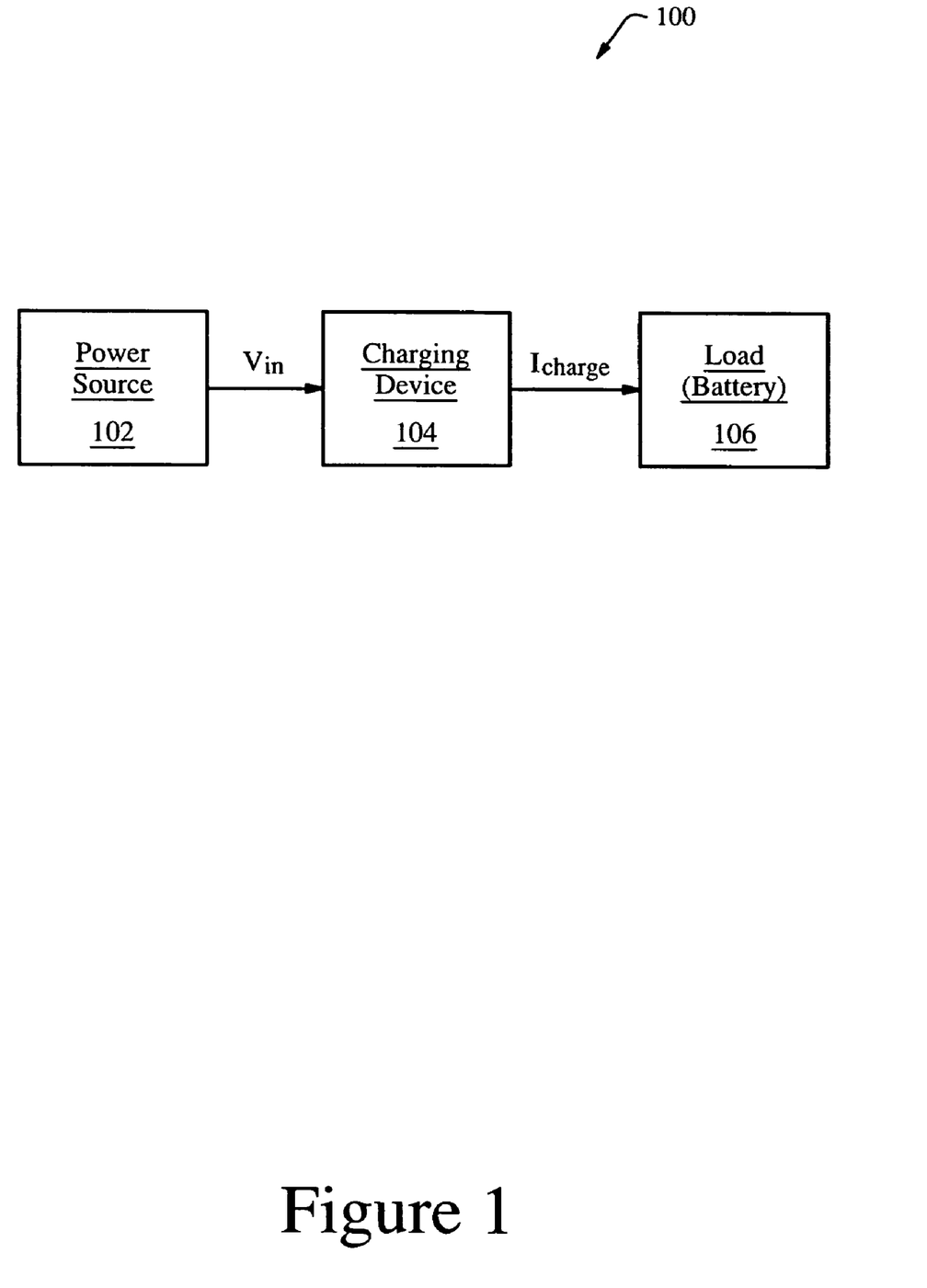
FIG. 1 illustrates a block diagram of a system.

FIG. 1 illustrates a block diagram of system 100. System 100 includes power source 102, charging device 104, and load 106. In one embodiment, power source 102 may be an Alternating Current (AC) source, a Direct Current (DC) source, a battery, a universal power supply, and the like. While load 106 may represent a battery that is being charged, load 106 may also include a portable device that is arranged to receive its supply voltage from charging device 104 for operation and battery charging.

As mentioned above, load 106 may include a rechargeable battery. Batteries may be used to supply power to portable devices such as personal computers, radios, radiophones, stereo cassette tape players etc. Such batteries are typically available in two different types such as those characterized as rechargeable or non-rechargeable and exhibit different end of life voltage characteristics and effective series resistances. Non-rechargeable battery types are those ordinary alkaline batteries that should not be subjected to recharging attempts. Rechargeable battery types are include nickel-cadmium (Ni—Cd), nickel-hydrogen (Ni—H), lithium-ion (Li-Ion), and recently developed nickel metal-hydride (Ni—MH) batteries that are charged at different rates with different conditions.

When a rechargeable battery is used as a power supply system for a portable personal computer, cellular phone, and the like, the battery may be charged by a battery charger in different charging modes, for example, a run and charging mode. Charging operations of such a battery may be classified in at least one of a fast or rapid charging, a quick charging, a standard charging, and a trickle charging modes. The charging modes may be in relation with charging capacities or charging current of the battery. In the fast charge mode, a relatively larger charging current may be applied to the battery over a relatively short period of time, for example one to two hours. In the quick charge mode, a relatively large charging current may be applied to the battery over a relatively shorter period of time, for example four to six hours. In the standard charge mode, a relatively smaller charging current may be applied to the battery over a relatively longer period of time, for example eight to ten hours. In the trickle charge mode, the battery charging circuit provides a relatively even smaller constant current to the battery without interruption. In this mode, the battery may not be charged but its power loss due to natural discharge may be compensated.

During all charging operations, a charge level of the battery may be monitored so that, when the battery reaches its maximum charge level, the charging operation is terminated in order to prevent overcharging and damage to the battery. Another approach is employing a safety timer for protection against overcharging.

Charging device 104 may include a switching regulator, a linear regulator, a current regulator, and the like. Charging device 104 is arranged to convert power from power source 102 and to provide load 106 with appropriate power. In one embodiment, charging device 104 may be a linear regulator that is arranged to receive input voltage $V_{IN}$ and provide a charging current $I_{charge}$ to load 106. Charging device 104 may employ different charging approaches depending on a type of load 106. Furthermore, charging device 104 may include additional functionality such as monitoring of various conditions of load 106 as well as power source 102. For example, charging device 104 may be a dual source power supply that is arranged to select between two available power sources and provide charging current to load 106 based on a number of pre-defined selection criteria.

In one embodiment, charging device 104 may include protection mechanisms against overcharging such as a safety timer. The safety timer may work based on a predetermined condition. In a one embodiment, the safety timer of charging device 104 may be controlled by a signal based on charging current $I_{charge}$.

The safety timer may reduce charging current $I_{charge}$ to substantially zero when the timer expires. Rather than employing a fixed amount of time upon which the timer expires, the safety timer is based on charging current $I_{charge}$, or based on a signal that is employed to adjust current $I_{charge}$.

Figure 2:
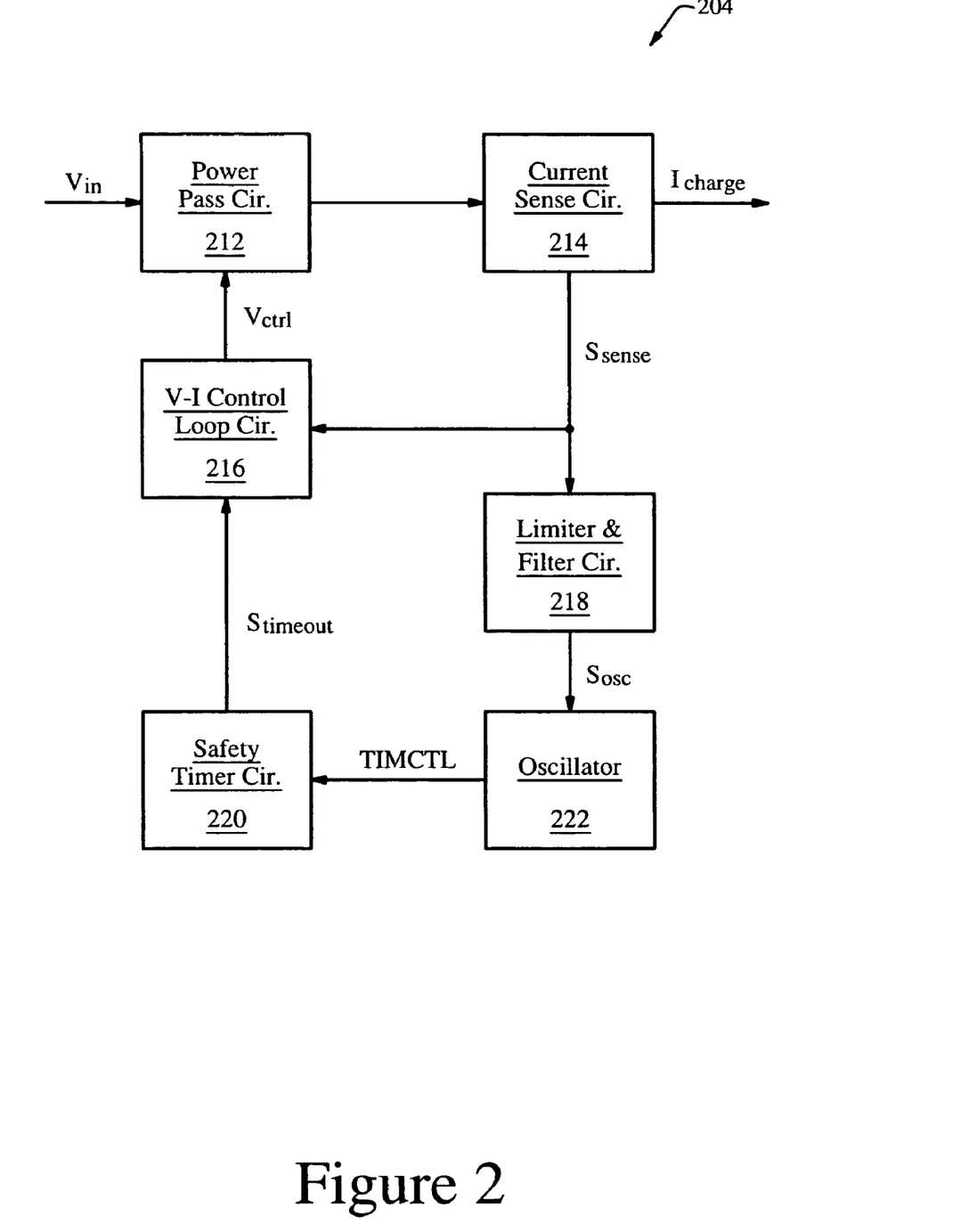
FIG. 2 illustrates a block diagram of one embodiment of the charging device of FIG. 1.

FIG. 2 illustrates a block diagram of charging device 204. Charging device 204 may be one embodiment of charging device 104 of FIG. 1. Charging device 204 includes power pass circuit 212, current sense circuit 214, voltage-current (V-I) control loop circuit 216, limiter and filter circuit 218, safety timer circuit 220, and oscillator 222.

Power pass circuit 212 is arranged to receive input voltage $V_{in}$ and control voltage $V_{ctrl}$, and to provide a charge current based on $V_{in}$ and $V_{ctrl}$. $V_{in}$ may be provided by a power supply circuit, a battery, and the like. In one embodiment, power pass circuit 212 may include at least one power pass transistor. The at least one power pass transistor may include an n-type transistor and/or a p-type transistor.

Current sense circuit 214 is arranged to receive the charge current and to provide sense signal $S_{sense}$ based on the charge current. Sense signal $S_{sense}$ may include at least one of a current and a voltage. In one embodiment, current sense circuit 214 is a current sense transistor that is arranged in a current mirror relationship with power pass circuit 212. In another embodiment, current sense circuit 214 is a current sense resistor.

V-I control loop circuit 216 is arranged to receive $S_{sense}$ and to provide $V_{ctrl}$, which controls a regulation of $I_{charge}$ by power pass circuit 212. In one embodiment, V-I control loop circuit 216 may include a differential amplifier circuit, a buffer circuit, a comparator circuit, and the like, that are arranged to provide $V_{ctrl}$ to a gate of the at least one power pass transistor of power pass circuit 212. Accordingly, a cascade of events resulting in $I_{charge}$ decreasing to substantially zero may occur, if V-I control loop circuit 216 is deactivated. For example, V-I control circuit 216 may be arranged such that, if timeout signal $S_{timeout}$ is asserted, $V_{ctrl}$ is reduced to about zero Volts. This may result in a gate-source voltage of the at least one power pass transistor decreasing to substantially zero and turning off power pass circuit 212, thereby reducing $I_{charge}$ to about zero.

Although V-I control loop 216 is shown in FIG. 2, in other embodiments, V-I control loop 216 may be replaced with a type of charge current control circuit other than V-I control loop 216. The charge current control loop may include current-mode feedback and/or voltage-mode feedback.

Safety timer circuit 220 is arranged to provide timeout signal $S_{timeout}$ to V-I control loop circuit 216 based on timer control signal TIMCTL. Safety timer circuit 220 may include a counter that is arranged to provide $S_{timeout}$ based on a frequency of timer control signal TIMCTL. Timer control signal TIMCTL, having a frequency $f_{Icharge}$, may be provided by oscillator circuit 222. Safety timer circuit 220 may be arranged to count the number of pulses that occur in signal TIMCTL during battery charging. Safety timer circuit 220 is arranged to assert signal Stimeout if a pre-determined number pulses are counted.

Accordingly, in this embodiment, rather than timing out battery charging after a fixed amount of time, the amount of time counted is substantially inversely proportional to charging current Icharge. Charging device 204 may be employed to detect a substantially correct amount of charging time, as well as to detect a bad battery.

Oscillator circuit 222 may include a voltage-controlled oscillator and/or a current-controlled oscillator. In one embodiment, oscillator circuit 222 may be configured to have a linear transfer characteristic such that $f_{Icharge}$ increases and decreases in linear proportion to an input signal ($S_{osc}$) of oscillator circuit 222. In any case, oscillator circuit 222 is arranged such that frequency $f_{Icharge}$ of signal TIMCTL is based on signal $S_{osc}$. Oscillator circuit 222 operates a timer control circuit that provides signal TIMCTL.

According to an embodiment of charging device 204, as shown in FIG. 2, $S_{osc}$ may be a conditioned version of sense signal $S_{sense}$. Limiter and filter circuit 218 may be arranged to receive $S_{sense}$ and provide $S_{osc}$, such that instantaneous changes in $S_{sense}$ based on $I_{charge}$ are substantially reduced. This may prevent unintentional triggering of a safety timeout in charging device 204 caused by sudden changes in charge current due to reasons such as momentary disconnect of a battery, activation of a cellular phone while the battery is charging, and the like. One embodiment of limiter and filter circuit 218 is shown in greater detail below with reference to FIG. 7.

FIG. 2 shows a particular arrangement of inputs and outputs of the various components of charging device 204. In one embodiment, all of the components of charging device 204 may be included in the same chip. Alternatively, one or more of the components may be off-chip.

Figure 3:
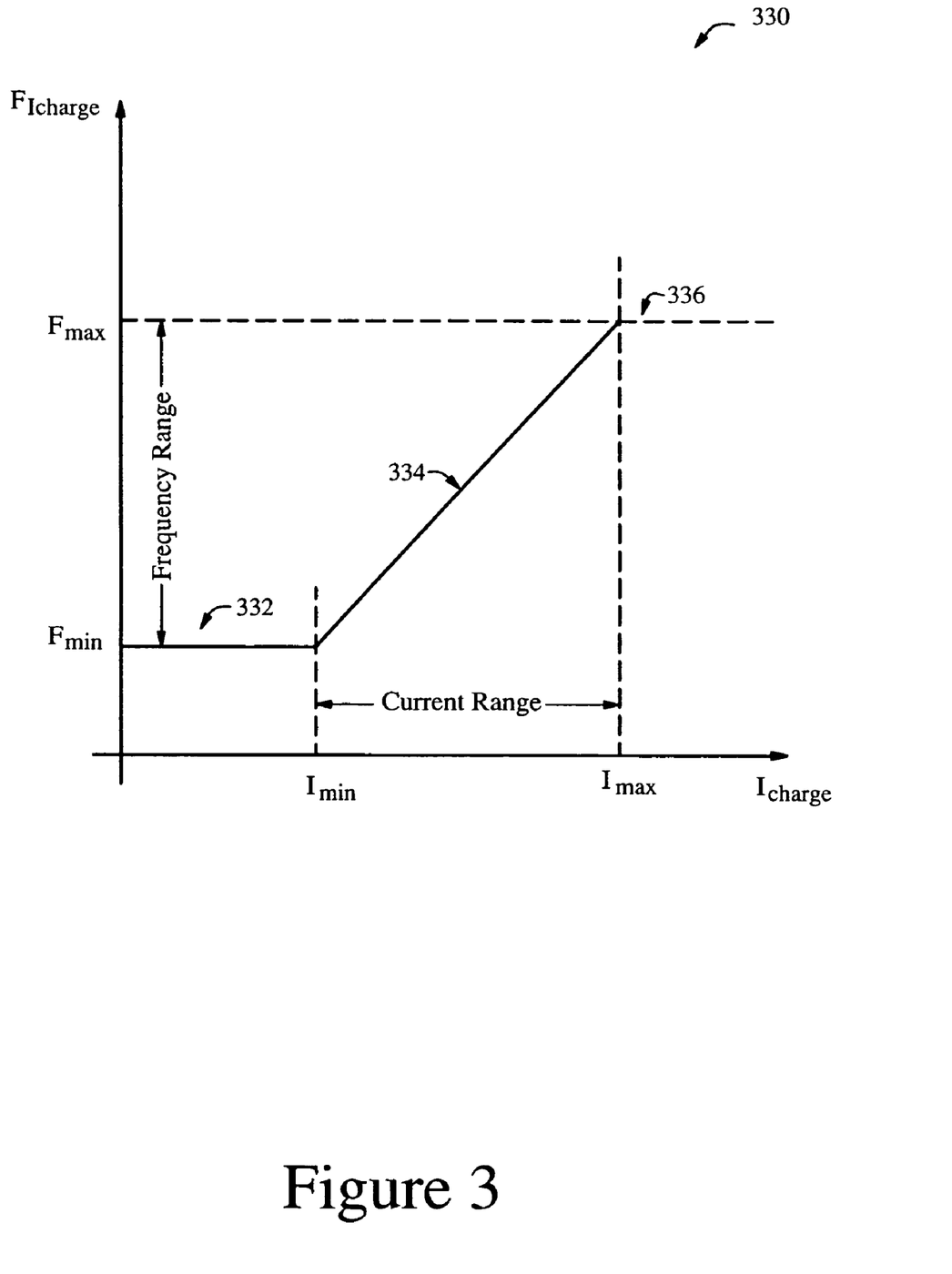
FIG. 3 illustrates a frequency-current characteristic diagram of the oscillator of the charging device of FIG. 2.

FIG. 3 illustrates frequency-current characteristic diagram 300 of oscillator 222, which is part of charging device 204 of FIG. 2.

Frequency-current characteristic diagram 300 illustrates a frequency response $f_{Icharge}$ of oscillator 222 of FIG. 2 to an input current. In one embodiment, the input current to oscillator 222 may be charging current $I_{charge}$. Accordingly, vertical and horizontal axes of frequency-current characteristic diagram 300 are arranged to show $f_{Icharge}$ and $I_{charge}$, respectively.

Along the vertical axis, an operation range of the oscillator is denoted between output frequency values $f_{min}$ and $f_{max}$. Along the horizontal axis, the operation range corresponds to a range between input current values $I_{min}$ and $I_{max}$.

The frequency-current characteristic of oscillator 222 below the operation range is illustrated by characteristic 332. As characteristic 332 shows, output frequency $f_{Icharge}$ has a substantially constant value (at about $f_{min}$) for values of $I_{charge}$ below $I_{min}$. A similar frequency response occurs above the operation range. As characteristic 336 shows, $f_{Icharge}$ is substantially constant at about $f_{max}$ for values of $I_{charge}$ above $I_{max}$.

Within the operation range, frequency response $f_{Icharge}$ is substantially linear with a slope of $$\frac{f_{max} - f_{min}}{I_{max} - I_{min}}.$$

As characteristic 334 shows, $f_{Icharge}$ increases linearly for values of $I_{charge}$ between $I_{min}$ and $I_{max}$ starting at about $f_{min}$ and reaching about $f_{max}$.

As explained below, a safety timer circuit, arranged to provide a safety timeout signal for deactivating the power pass circuit, may include a counter circuit that provides the safety timeout signal based on a frequency of the timer control signal provide by the oscillator circuit. In an operation, as $I_{charge}$ decreases with a charge status of the load battery, the frequency of the timer control circuit may also decrease according to the above described characteristic. Accordingly, the counter circuit of the safety timer circuit may trigger the safety timeout signal at a predetermined limit for $f_{Icharge}$ deactivating V-I control loop circuit and thereby the power pass circuit.

Figure 4:
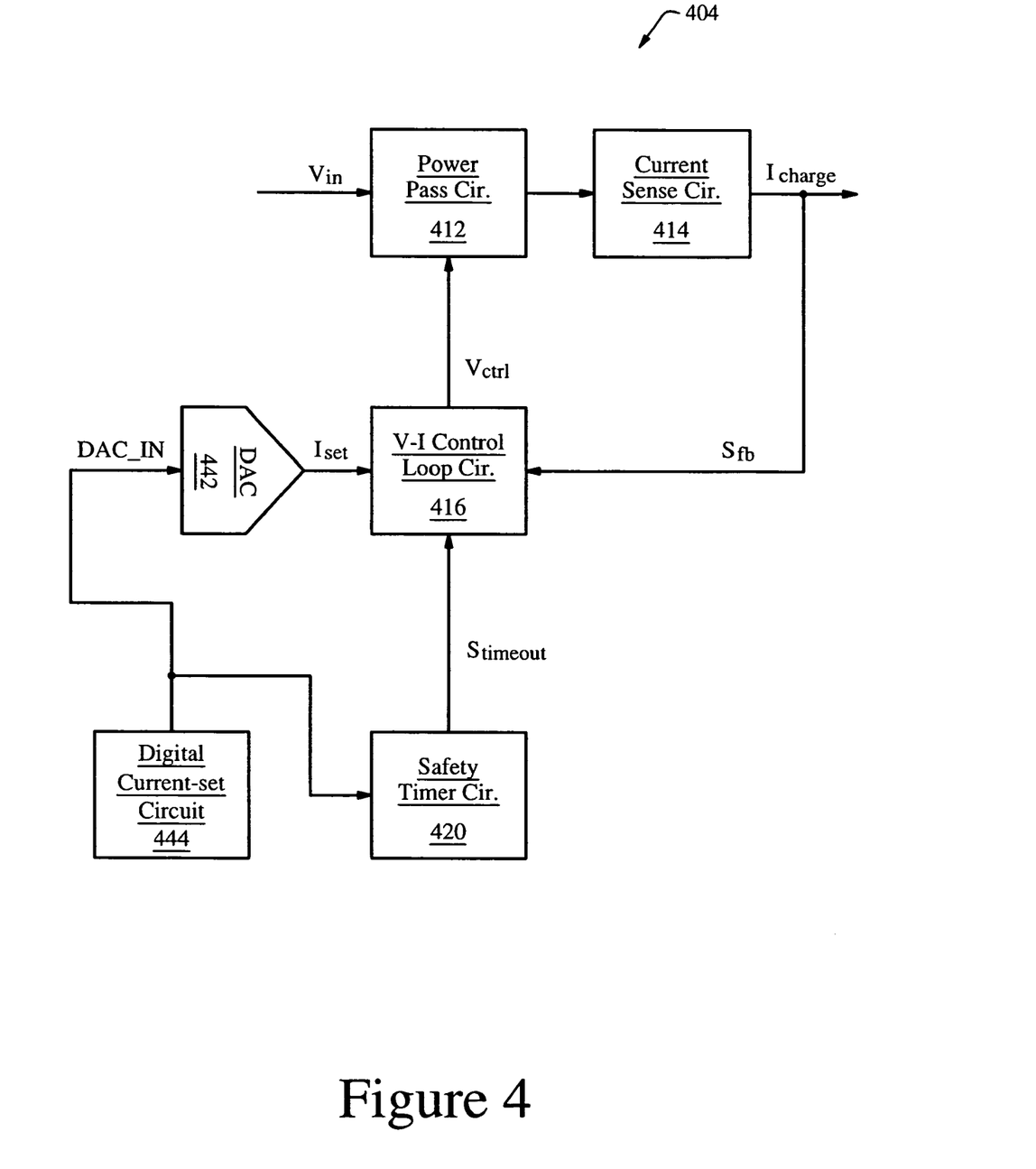
FIG. 4 illustrates a block diagram of another embodiment of the charging device of FIG. 1.

FIG. 4 illustrates a block diagram of charging device 404. Charging device 404 is another embodiment of charging device 104 of FIG. 1. Charging device 404 includes power pass circuit 412, current sense circuit 414, voltage-current (V-I) control loop circuit 416, safety timer circuit 420, digital current-set circuit 444, and digital-to-analog converter (DAC) 442.

Components of charging device 404 shown in FIG. 4 that are similarly named in FIG. 2 operate in substantially similar manner as discussed above, and may operate in a different manner in some ways. Charging device 404 includes digital current-set circuit 444 and DAC 442 as a timer control circuit rather than employing oscillator 222 as a timer control circuit as in FIG. 2.

In an operation, digital current-set circuit 444 is arranged to provide digital signal DAC_IN, which is employed to determine setting current $I_{set}$. Current $I_{set}$ may be employed by V-I control loop circuit 416 to limit a regulation of $I_{charge}$. Digital current-set circuit 444 is arranged to provide signal DAC_IN to DAC 442, which may convert signal DAC_IN to provide $I_{set}$ to V-I control loop circuit 416. V-I control loop circuit 416 is arranged to provide signal $V_{Ctrl}$ based on sensed feedback signal $S_{fb}$ from sense circuit 414 and setting current $I_{set}$.

Because signal DAC_IN is ultimately employed to determine a value of $I_{charge}$, it may also be employed to provide safety timeout signal $S_{timeout}$ to V-I control loop circuit 416. In one embodiment, safety timer circuit 420 may include a digital counter, that is configured to provide $S_{timeout}$ to V-I control loop circuit 416 based on a value of signal DAC_IN. This approach may avoid determining the safety timeout based on sensed $I_{charge}$.

FIG. 4 shows a particular arrangement of inputs and outputs of the various components of charging device 404. In one embodiment, all of the components of charging device 404 may be included in the same chip. Alternatively, one or more of the components may be off-chip.

Although V-I control loop 416 is shown in FIG. 4, in other embodiment, V-I control loop 416 may be replaced with a type of charge current control circuit other than V-I control loop 416. The charge current control loop may include current-mode feedback and/or voltage-mode feedback.

Figure 5:
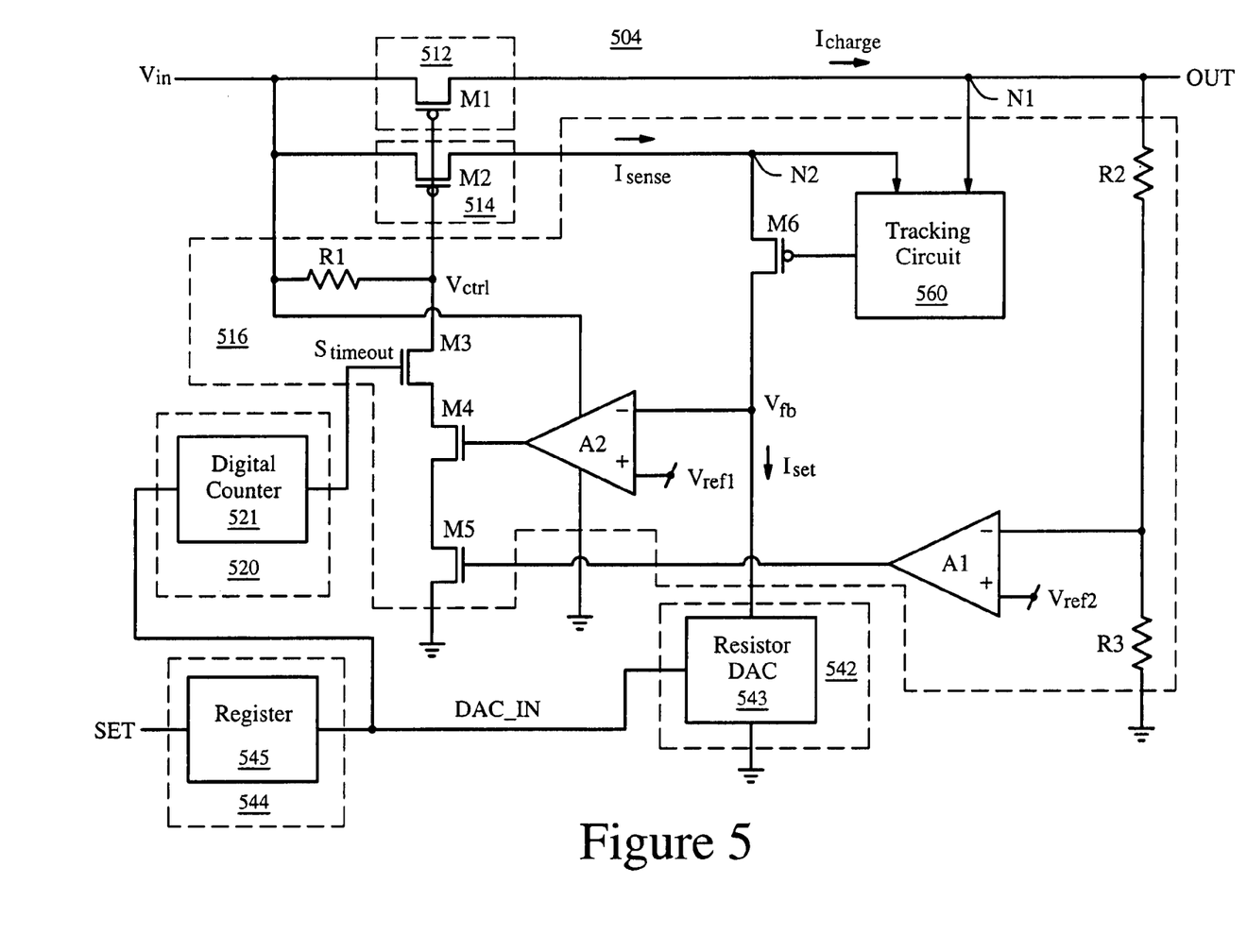
FIG. 5 shows a block diagram of an embodiment of the charging device of FIG. 4.

FIG. 5 shows a block diagram of charging device 504, which is an embodiment of charging device 404 of FIG. 4. Power pass circuit 512 includes transistor M1. Current sense circuit 514 includes transistor M2. V-I control loop 516 includes resistors R1-R3, tracking circuit 560, op amps A1 and A2, and transistors M3 M6. Safety timer 530 includes digital counter 521. Digital current-set circuit 544 includes register 545. DAC 542 includes resistor DAC 543.

Voltage $V_{fb}$ is an embodiment of signal $S_{fb}$ of FIG. 4. Tracking circuit 560 is arranged to adjust the voltage at node N2 such that it is substantially equal to the voltage at node N1.

Register 545 is arranged to receive digital signal SET, which may be provided as an external signal to adjust set current Iset to adjust charging current Icharge. Register 545 is arranged to provide signal DAC_IN based on signal SET. Resistor DAC 543 is arranged such that a resistance associated with resistor DAC 543 is substantially proportional to signal DAC_IN. Accordingly, set current Iset is proportional to signal DAC_IN.

Digital counter 521 is arranged to cumulatively add or subtract each value associated with signal DAC_IN. Further, digital counter 521 is arranged to assert signal Stimeout if the cumulative total reaches a pre-determined value. Transistor M3 is arranged as a switch that opens if signal Stimeout is asserted.

Accordingly, in this embodiment, rather than timing out battery charging after a fixed amount of time, the amount of time counted is substantially inversely proportional to charging current Icharge.

Figure 6:
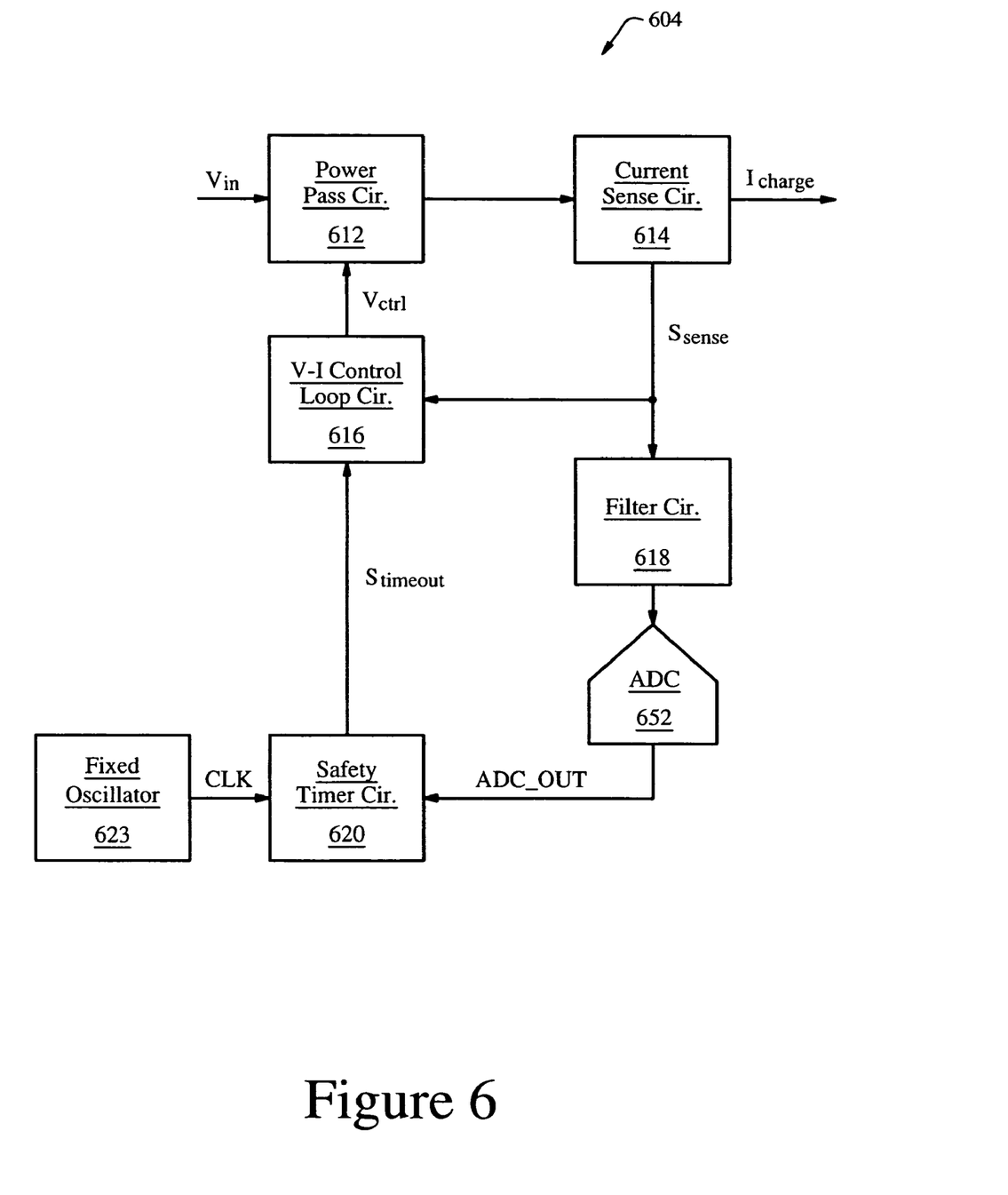
FIG. 6 illustrates a block diagram of yet another embodiment of the charging device of FIG. 1.

FIG. 6 illustrates a block diagram of charging device 604. Charging device 604 is another embodiment of charging device 104 of FIG. 1. Charging device 604 includes power pass circuit 612, current sense circuit 614, voltage-current (V-I) control loop circuit 616, filter circuit 618, safety timer circuit 620, fixed oscillator 623, and analog-to-digital converter (ADC) 652.

Components of charging device 604 shown in FIG. 6 that are similarly named in FIG. 2 operate in substantially the same way as discussed above, and may be different in some ways.

According to the embodiment shown in the figure, safety timer circuit 620 may include a digital counter that is arranged to provide safety timeout signal $S_{timeout}$ based on digitized signal ADC_OUT from ADC 652. ADC 652 may provide signal ADC_OUT based on an analog-to-digital conversion of conditioned sense signal $S_{sense}$. ADC 652 is arranged to operate in charging device 604 is a timer control circuit. As described previously, $S_{sense}$ may include at least one of a current and a voltage.

Fixed oscillator 623 is arranged to provide clock signal CLK such that signal CLK has a substantially fixed frequency.

In one embodiment, safety timer circuit 620 is arranged to count pulses in signal CLK. Safety timer circuit 620 is arranged to assert signal Stimeout if the count reaches a value that corresponds to signal ADC_OUT. Accordingly, in this embodiment, rather than timing out battery charging after a fixed amount of time, the amount of time is substantially inversely proportional to charging current Icharge.

FIG. 6 shows a particular arrangement of inputs and outputs of the various components of charging device 604. In one embodiment, all of the components of charging device 604 may be included in the same chip. Alternatively, one or more of the components may be off-chip.

Although V-I control loop 616 is shown in FIG. 6, in other embodiment, V-I control loop 616 may be replaced with a type of charge current control circuit other than V-I control loop 616. The charge current control loop may include current-mode feedback and/or voltage-mode feedback.

Figure 7:
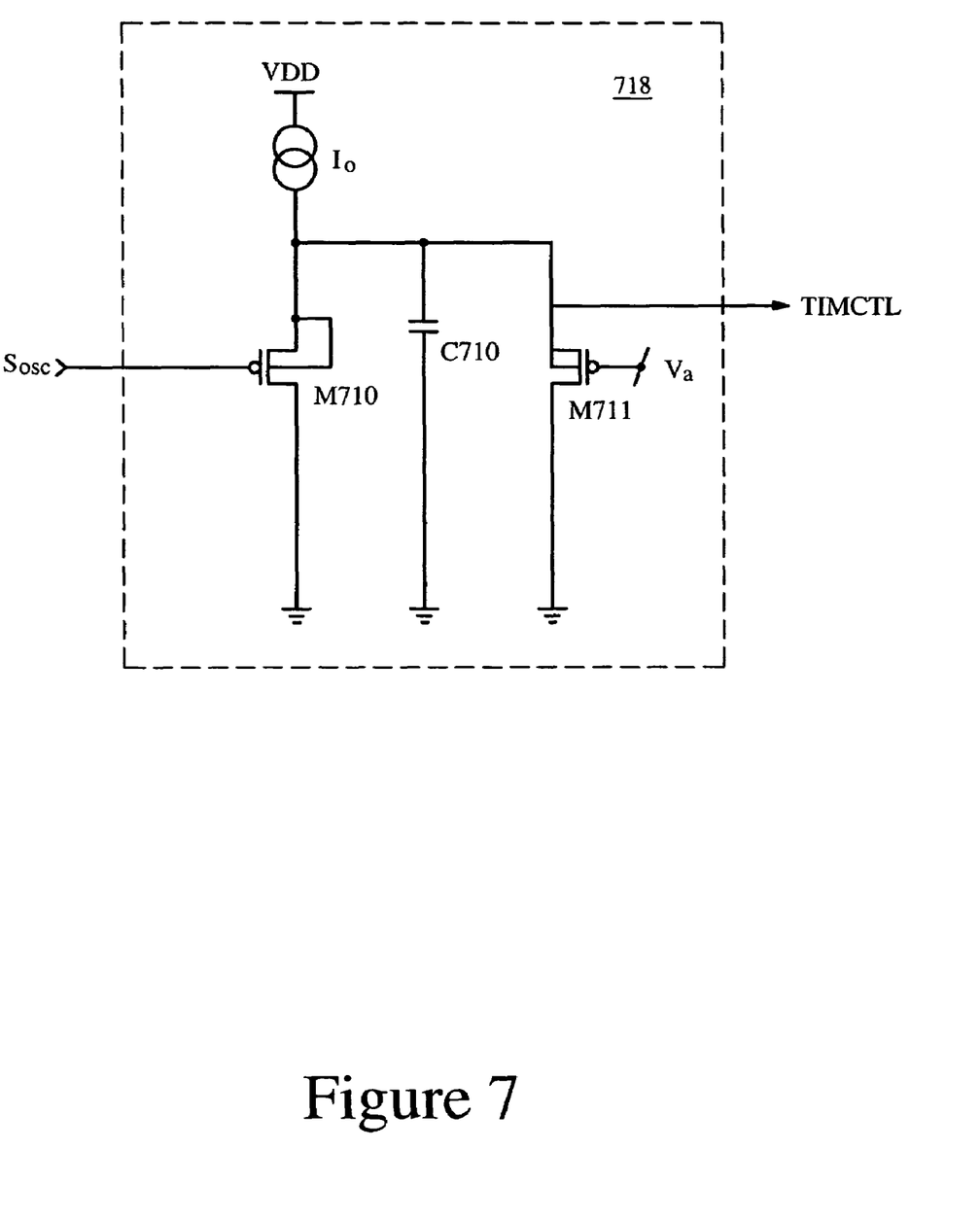
FIG. 7 shows a schematic diagram of an embodiment of the limiter and filter circuit of FIG. 2.

FIG. 7 shows a schematic diagram of an embodiment of limiter and filter circuit 718, which may be employed as an embodiment of limiter and filter circuit 218 of FIG. 2. Limiter and filter circuit 718 includes current source $I_0$, transistors M710 and M711, and capacitor M710. Although FIG. 7 shows one embodiment of a filter and limiter circuit, other embodiments are within the scope and spirit of the invention.

The above specification, examples and data provide a description of the manufacture and use of the composition of the invention. Since many embodiments of the invention can be made without departing from the spirit and scope of the invention, the invention also resides in the claims hereinafter appended.

We claim:

1. A circuit for charging a battery, comprising:
   a power pass circuit that is arranged to receive a power source voltage and to provide a regulated charge current in response to the power source voltage and a control voltage;
   a sense circuit that is arranged to receive the charge current and to provide a sense signal in response to the charge current;
   a charge current control circuit that is arranged to receive the sense signal and to provide the control voltage based on the sense signal;
   a timer control circuit that is arranged to provide a timer control signal with a frequency that is based, in part, on the sense signal; and
   a safety timer circuit that is arranged to deactivate and reactivate the charge current control circuit based on the timer control signal and to detect an amount of charging time based on the frequency of the timer control signal.

2. The circuit of claim 1, wherein the timer control circuit is arranged to provide the timer control circuit such that the safety timer circuit deactivates the charge current control circuit an amount of time after a start of charging that is substantially inversely proportional to the charging current.

3. The circuit of claim 1, wherein the timer control circuit includes an oscillator circuit that is arranged to provide the timer control signal such that the timer control signal has the frequency based on the sense signal.

4. The circuit of claim 3, further comprising:
   a limiter and filter circuit that is arranged to condition the sense signal such that the oscillator circuit is de-sensitized against instantaneous changes in the sense signal.

5. The circuit of claim 4, wherein the oscillator circuit is arranged to have a linear transfer characteristic such that the frequency of the timer control signal is substantially linearly proportional to the sense signal.

6. The circuit of claim 4, wherein the power pass circuit includes a power pass transistor that is arranged to receive the power source voltage at a source terminal, to receive the control voltage at a gate terminal, and to provide the charge current at a drain terminal.

7. The circuit of claim 4, wherein the safety timer circuit includes a counter circuit that is arranged to assert a timeout signal based on the frequency of the timer control circuit.

8. The circuit of claim 7, wherein the charge current control circuit is a V-I control loop circuit that is arranged such that, if the timeout signal is asserted, the V-I control loop circuit deactivated such that a value of the charge current is decreased to substantially zero.

9. The circuit of claim 1, wherein the power pass circuit includes a power pass transistor that is arranged to receive the power source voltage at a source terminal, to receive the control voltage at a gate terminal, and to provide the charge current at a drain terminal.

10. The circuit of claim 1, wherein the safety timer circuit includes a counter circuit that is arranged to assert a timeout signal if a count of the counter circuit reaches a limit.

11. The circuit of claim 10, wherein the charge current control circuit includes a V-I control loop circuit that is arranged such that, if the timeout signal is asserted, the V-I control loop circuit deactivated such that a value of the charge current is decreased to substantially zero.

\* \* \* \* \*

UNITED STATES PATENT AND TRADEMARK OFFICE
CERTIFICATE OF CORRECTION

PATENT NO. : 7,560,899 B1
APPLICATION NO. : 11/013133
DATED : July 14, 2009
INVENTOR(S) : Vladislav Potanin et al.

It is certified that error appears in the above-identified patent and that said Letters Patent is hereby corrected as shown below:

In column 6, line 35, delete "M3 M6." and insert -- M3-M6 --, therefor.

Signed and Sealed this

Eighth Day of December, 2009

David J. Kappos
*Director of the United States Patent and Trademark Office*